(12) United States Patent
May

(10) Patent No.: US 8,666,627 B2
(45) Date of Patent: Mar. 4, 2014

(54) AIRCRAFT BRAKE CONTROL ARCHITECTURE HAVING IMPROVED ANTISKID REDUNDANCY

(75) Inventor: Bill May, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 586 days.

(21) Appl. No.: 12/595,369

(22) PCT Filed: May 15, 2008

(86) PCT No.: PCT/US2008/063682
§ 371 (c)(1),
(2), (4) Date: Oct. 9, 2009

(87) PCT Pub. No.: WO2008/144378
PCT Pub. Date: Nov. 27, 2008

(65) Prior Publication Data
US 2010/0070150 A1    Mar. 18, 2010

Related U.S. Application Data

(60) Provisional application No. 60/939,063, filed on May 19, 2007.

(51) Int. Cl.
*B60T 8/17*   (2006.01)
*B60T 8/88*   (2006.01)

(52) U.S. Cl.
CPC ............... *B60T 8/1703* (2013.01); *B60T 8/885* (2013.01); *B60T 2270/413* (2013.01)
USPC .............................................. 701/76; 701/71

(58) Field of Classification Search
USPC .......................................................... 701/71
See application file for complete search history.

(56) References Cited

U.S. PATENT DOCUMENTS

| 4,180,223 | A | * | 12/1979 | Amberg | 244/111 |
| 4,923,253 | A | * | 5/1990 | Pollner et al. | 303/7 |
| 5,044,697 | A | * | 9/1991 | Longyear et al. | 303/14 |
| 5,397,173 | A | * | 3/1995 | Bourguet | 303/2 |
| 6,296,325 | B1 | * | 10/2001 | Corio et al. | 303/20 |
| 6,390,571 | B1 | * | 5/2002 | Murphy | 303/126 |

(Continued)

OTHER PUBLICATIONS

International Preliminary Report on Patentability for PCT/US2008/063682, dated Nov. 19, 2009.

(Continued)

*Primary Examiner* — Shelley Chen
(74) *Attorney, Agent, or Firm* — Snell & Wilmer, L.L.P.

(57) ABSTRACT

An electromechanical braking system includes first and second electromechanical actuator controllers (EMACs) that each independently generate a complete set of drive control signals for an associated set of electromechanical actuators (EMAs). The drive control signals are generated in accordance with an antiskid algorithm to impart antiskid control to the braking of wheels associated with the EMAs. Drive signals for some of the EMAs from the set of EMAs are output by drivers of the first EMAC and drive signals for the other EMAs from the set of EMAs are output by drivers of the second EMAC. Drive control signals from one of the EMACs are used to control output the drive signals for all the EMAs from the set of EMAs, regardless of the EMAC in which the associated drivers are present. The drive control signals from the other of the EMACs are used as a backup set of drive control signals.

18 Claims, 3 Drawing Sheets

(56) References Cited

U.S. PATENT DOCUMENTS

| | | | |
|---|---|---|---|
| 6,513,885 B1* | 2/2003 | Salamat et al. | 303/122.09 |
| 7,258,404 B2* | 8/2007 | Butler et al. | 303/9.61 |
| 2003/0111895 A1* | 6/2003 | Salamat et al. | 303/9.61 |
| 2005/0040286 A1* | 2/2005 | Radford | 244/111 |
| 2005/0251306 A1* | 11/2005 | Gowan et al. | 701/35 |
| 2006/0293805 A1* | 12/2006 | Garcia | 701/16 |
| 2008/0030069 A1* | 2/2008 | Griffith et al. | 303/20 |
| 2008/0149436 A1* | 6/2008 | Griffith et al. | 188/110 |
| 2008/0258547 A1* | 10/2008 | Ralea et al. | 303/122 |

OTHER PUBLICATIONS

Written Opinion for PCT/US20081063682, dated Nov. 21, 2009.
Publication with International Search report for PCT/US2008/063682, dated Nov. 27, 2008.

* cited by examiner

AIRCRAFT BRAKE CONTROL ARCHITECTURE HAVING IMPROVED ANTISKID REDUNDANCY

CROSS-REFERENCE TO RELATED APPLICATIONS

This application is a U.S. National Phase filing under 35 U.S.C. 371 and claims priority to PCT Application No. PCT/US08/63682, filed on May 15, 2008, and entitled "AIRCRAFT BRAKE CONTROL ARCHITECTURE HAVING IMPROVED ANTISKID REDUNDANCY," which claims priority to U.S. Provisional Patent Application Ser. No. 60/939,063, filed May 19, 2007, both of which are incorporated herein by reference in their entirety.

TECHNICAL FIELD

The present invention relates generally to brake systems for vehicles, and more particularly to an electromechanical braking system for use in an aircraft.

BACKGROUND OF THE INVENTION

Various types of braking systems are known. For example, hydraulic, pneumatic and electromechanical braking systems have been developed for different applications.

An aircraft presents a unique set of operational and safety issues. As an example, uncommanded braking due to failure can be catastrophic to an aircraft during takeoff. On the other hand, it is similarly necessary to have virtually fail-proof braking available when needed (e.g., during landing).

If one or more engines fail on an aircraft, it is quite possible that there will be a complete or partial loss of electrical power. In the case of an electromechanical braking system, loss of electrical power, failure of one or more system components, etc. raises the question as to whether and how adequate braking may be maintained. It is critical, for example, that braking is available during an emergency landing even in the event of a system failure.

In order to address such issues, various levels of redundancy have been introduced into aircraft brake control architectures. In the case of electromechanical braking systems, redundant powers sources, brake system controllers, electromechanical actuator controllers, etc. have been utilized in order to provide satisfactory braking even in the event of a system failure. For example, U.S. Pat. Nos. 6,296,325 and 6,402,259 describe aircraft brake control architectures providing various levels of redundancy in an electromechanical braking system to ensure satisfactory braking despite a system failure.

Nevertheless, it is still desirable to continue to improve the level of braking available in electromechanical braking systems even in the event of a system failure. As an example, in the past, the level of antiskid control available during a system failure could be substantially reduced. Thus, it is desirable to have a brake control system architecture that provides improved antiskid control despite a power failure, system component failure, etc., as compared with conventional electromechanical braking systems.

SUMMARY OF THE INVENTION

An electromechanical braking system may include first and second electromechanical actuator controllers (EMACs) that each independently generate a complete set of drive control signals for an associated set of electromechanical actuators (EMAs). The drive control signals are generated in accordance with an antiskid algorithm to impart antiskid control to the braking of wheels associated with the EMAs. Drive signals for some of the EMAs from the set of EMAs are output by drivers of the first EMAC and drive signals for the other EMAs from the set of EMAs are output by drivers of the second EMAC. Drive control signals from one of the EMACs are used to control output the drive signals for all the EMAs from the set of EMAs, regardless of the EMAC in which the associated drivers are present. The drive control signals from the other of the EMACs are used as a backup set of drive control signals.

According to an aspect of the disclosure, an electromechanical braking system includes at least one brake system control unit (BSCU) for converting brake command signals into output brake command signals; a plurality of electromechanical actuators (EMAs) arranged with respect to wheels to be braked; a first electromechanical actuator controller (EMAC) that includes a first antiskid controller and includes a driver for each EMA controlled by the first EMAC, wherein the first antiskid controller generates a primary set of drive control signals based on the brake command signals from the BSCU and in accordance with an antiskid algorithm of the first antiskid controller, the primary set of drive control signals used to control each driver of the first EMAC to output corresponding drive signals to the corresponding EMAs; and a second EMAC that includes a second antiskid controller and includes a driver for each EMA controlled by the second EMAC, wherein the second EMAC receives at least some of the primary drive control signals from the first antiskid controller and uses the received primary drive control signals to control each driver of the second EMAC to output corresponding drive signals to the corresponding EMAs, and wherein the second antiskid controller generates a backup set of drive control signals for controlling each EMA controlled by the first and second EMACs, the backup set of drive control signals based on the brake command signals from the BSCU and in accordance with an antiskid algorithm of the second antiskid controller.

According to an embodiment of the braking system, the backup set of drive control signals are used in place of the primary drive control signals if operation of the second antiskid controller is determined to be better than operation of the first antiskid controller.

According to an embodiment of the braking system, the determination to use the backup set of drive control signals is made by the first antiskid controller.

According to an embodiment of the braking system, the wheels are wheels of an aircraft.

According to an embodiment of the braking system, the wheels are divided between two landing gear trucks.

According to an embodiment of the braking system, the first and second antiskid controllers exclusively carry out antiskid control for wheels of one of the trucks.

According to an embodiment of the braking system, antiskid control for wheels of the other of the landing gear trucks is carried out by at least one antiskid controller that is separate from the first and second antiskid controllers.

According to an embodiment, the braking system further includes additional EMAs arranged with respect to wheels of the other of the landing gear trucks; and third and fourth EMACs that respectively include third and fourth antiskid controllers that generate drive control signals that are used to control generation of drive signals that control the additional EMAs.

According to an embodiment of the braking system, the drivers of each EMAC are grouped into at least two groups and, for each EMAC, drive signals from a first group of drivers are coupled to respective EMAs over a first harness for the associated truck and EMAC, and drive signals from a second group of drivers are coupled to respective EMAs over a second harness for the associated truck and EMAC.

According to an embodiment of the braking system, the EMAs are arranged with respect to the wheels so that less than all EMAs per wheel receive drive signals over a single harness.

According to an embodiment of the braking system, the EMAs are arranged with respect to the wheels so that less than all EMAs per wheel receive drive signals from a single EMAC.

According to an embodiment of the braking system, for each EMAC, the groups of drivers are isolated, the isolation including separate connections to a power bus.

According to an embodiment of the braking system, the aircraft includes 8 braked wheels.

According to an embodiment of the braking system, the aircraft includes 12 braked wheels.

According to an embodiment, the braking system further includes wheel speed sensors that measure the speed of the wheels to be braked, and wherein outputs of the sensors are input to the antiskid controls of the EMACs independent of the at least one BSCU for purposes of performing the antiskid control.

According to an embodiment of the braking system, the first EMAC and the second EMAC receive power from independent power busses.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Aspects of the present invention will now be described with reference to the appended figures, in which like reference labels are used to refer to like components throughout.

Figure 1:
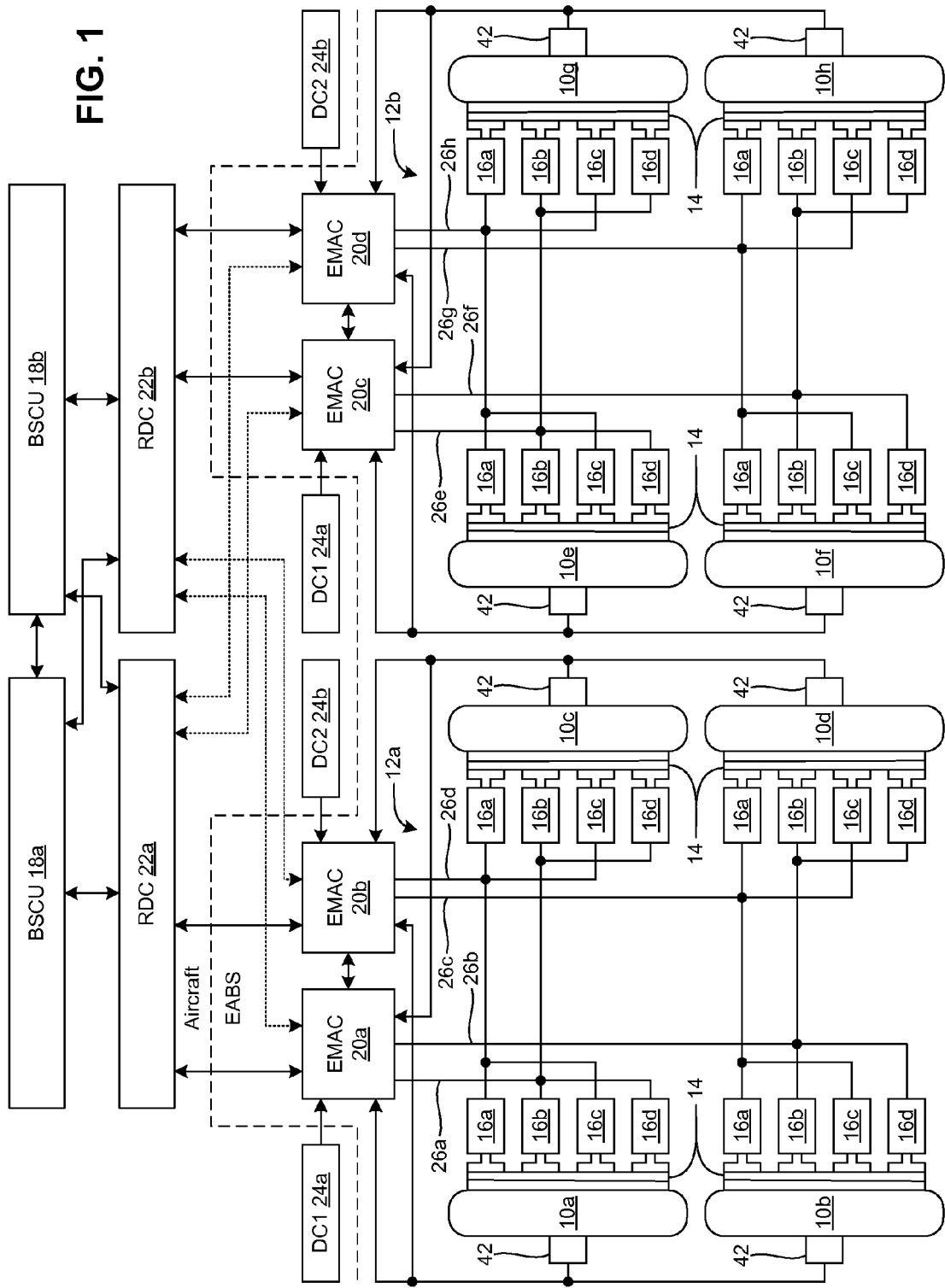
FIG. 1 is a block diagram of an exemplary aircraft brake control architecture for an aircraft having eight braked wheels.

Referring to FIG. 1, an exemplary braking system for an aircraft is shown in accordance with the invention. The braking system is shown as providing braking with respect to eight wheels, of which four wheels 10a-10d are mounted to a left landing gear truck 12a of an aircraft and four wheels 10e-10h are mounted to a right landing gear truck 12b of the aircraft. Each wheel 10 has a brake stack assembly 14. Braking force is applied to the brake stack assembly 14 using electromechanical actuators (EMAs) 16. In the illustrated embodiment, each wheel 10 is associated with four EMAs 16a-16d. A specific EMA 16 for a specific wheel 10 will be identified by the alphanumeric reference number for the EMA, followed by the alphanumeric reference number for the associated wheel. For example, a first one of the EMAs (EMA 16a) for the forward left wheel of the left truck 12a (wheel 10a) may be referred to as EMA 16a_10a. Similarly, a third one of the EMAs (EMA 16c) for the rearward right wheel of the left truck 12a (wheel 10d) may be referred to as EMA 16c_10d.

Figure 2:
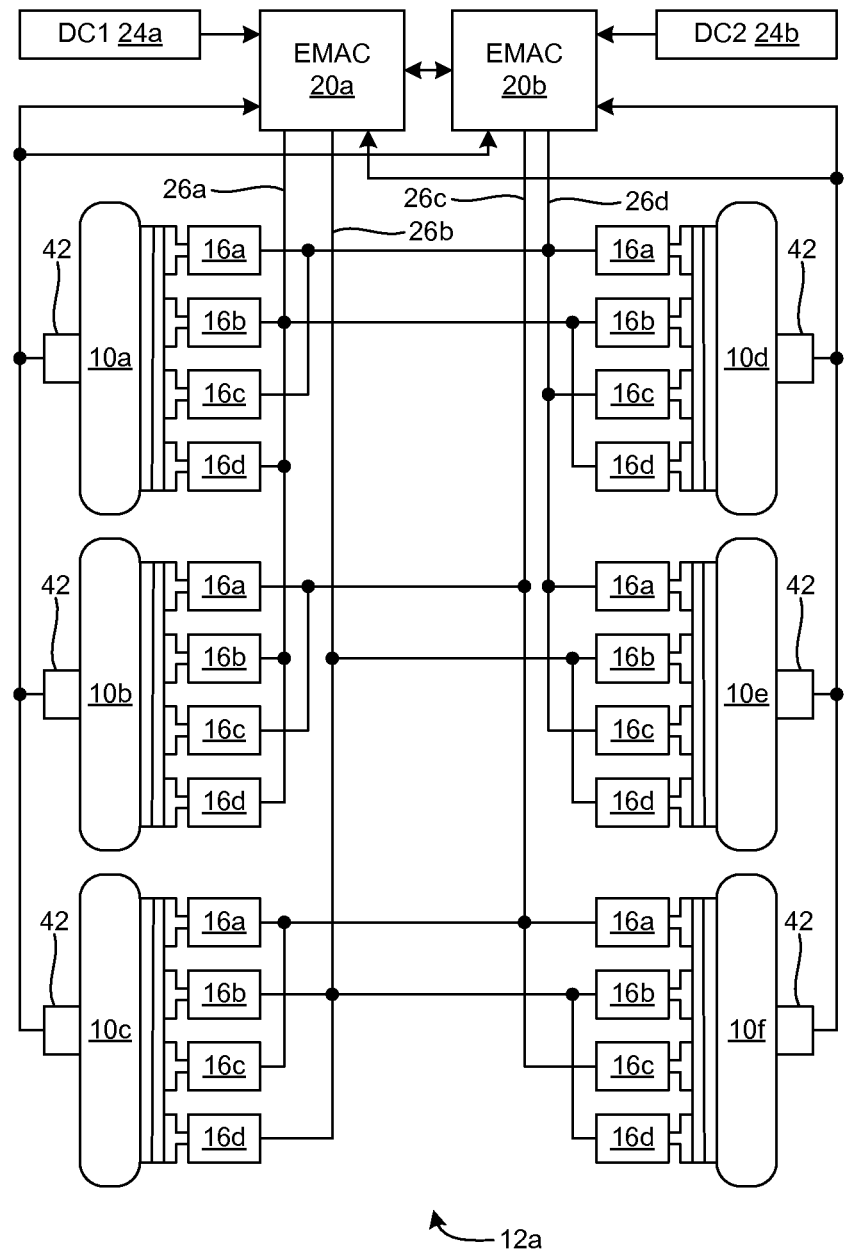
FIG. 2 is a block diagram of an exemplary aircraft brake control architecture for a single truck of an aircraft having twelve braked wheels.

It will be appreciated that aspects of the disclosed braking system architecture may be utilized with any number of wheels 10, any number of landing gear trucks, any number of axels per truck, any number of EMAs 16, etc. For instance, FIG. 2 shows the wheels 10 from a left truck 12a of an aircraft where there are six wheel associated with the left truck 12a. The wheels from the right truck 12b are not illustrated, but also may include six wheels arranged in similar fashion. In the embodiment of FIG. 2, there is a forward axel with two wheels 10, a center axel with two wheels 10 and a rear axel with two wheels 10. Each wheel 10 is associated with four EMAs 16.

With continued reference to FIG. 1, the braking system includes a least one upper level controller, or brake system control unit (BSCU) 18, for providing overall control of the braking system. In the illustrated embodiment, there is a first BSCU 18a and a second BSCU 18b. Two BSCUs 18 are present so as to provide redundancy to the braking system. The BSCUs 18 may be in accordance with any conventional controller, such as that described in the aforementioned U.S. Pat. Nos. 6,296,325 and 6,402,259.

The BSCUs 18 may receive an input brake command indicative of a desired amount of braking. For example, the input brake command is derived from brake pedals within the cockpit of the aircraft and indicates a degree to which the brake pedals are depressed, and hence the desired amount of braking. Based on such input, the BSCUs 18 provide output command signals intended to effectuate the desired amount of braking in relation to the input brake command. In effect, the output command signals may be indicative of a brake clamp force that is called for by the input brake command.

The output command signals from the BSCUs 18 are directed to EMACs 20 through a network of the aircraft. In the illustrated embodiment, signals are exchanged between the BSCUs 18 and the EMACs 20 through remote data concentrators (RDCs) 22. In the illustrated embodiment, two RDCs 22a and 22b are present so as to provide redundancy to the communications pathway between the BSCUs 18 and the EMACs 20.

In the illustrated embodiment, there are four EMACs 20a to 20d. The first EMAC 20a and the second EMAC 20b control operation of the EMAs 16 for the left truck 12a and the third EMAC 20c and the fourth EMAC 20d control operation of the EMAs 16 for the right truck 12b. Primary communication links between the EMACs 20 and the RDCs are shown in solid lines in FIG. 1 and secondary (e.g., backup) communication links between the EMACs 20 and RDCs 22 are shown in dotted lines in FIG. 1. The communication links may be implemented using an integrated modulation avionics (IMA) architecture over a switched transmit/receive protocol, such as avionics full duplex Ethernet (AFDX). A demarcation between components of the aircraft and components of an electrically activated braking system (EABS) portion of the overall braking system is shown using a dashed line in FIG. 1.

Two of the EMACs 20, such as the first EMAC 20a and the third EMAC 20c, may receive power to operate electronics in the respective EMACs 20 and power to supply actuation signals to the EMAs 16 from a first power bus 24a (referred to as DC1) of the aircraft. Similarly, the other two of the EMACs 20, such as the second EMAC 20b and the fourth EMAC 20d, may receive power to operate electronics in the respective EMACs 20 and to supply actuation signals to the EMAs 16 from a second power bus 24b (referred to as DC2) of the aircraft. The power busses 24 each may supply, for example, 28 VDC to power the electronics and 270 VDC for use in generating the actuation signals. As will become more clear below, the illustrated power supply arrangement allows for at least fifty percent of the braking to remain available even if one of the power buses 24 fails to make power available to the respective EMACs 20.

EMA drive signals are delivered from the EMACs 20 to associated EMAs 16 over conductors. The conductors are bundled into wire harnesses 26. In the illustrated arrangement, the wire harnesses 26 are arranged such that a failure of one harness 26 will allow for at least seventy-five percent of the EMAs 16 for the affected truck 12 to remain operable. One potential cause of failure of a harness is impact from debris or from a burst tire. In the illustrated embodiment, EMA drive signals are coupled from the first EMAC 20a to EMAs 16b_10a, 16d_10a, 16b_10c and 16b_10c over a first harness 26a. EMA drive signals are coupled from the first EMAC 20a to EMAs 16b_10b, 16d_10b, 16b_10d and 16b_10d over a second harness 26b. EMA drive signals are coupled from the second EMAC 20b to EMAs 16a_10b, 16c_10b, 16a_10d and 16c_10d over a third harness 26c. EMA drive signals are coupled from the second EMAC 20b to EMAs 16a_10a, 16c_10a, 16a_10c and 16c_10c over a fourth harness 26d. Fifth through eighth harnesses 26e to 26h couple the EMAs 16 of the right landing gear truck 12b to the third and fourth EMACs 20c and 20d in a similar manner.

In the embodiment of FIG. 2 (showing six wheels 10 of an aircraft with twelve braked wheels 10), there are four wire harnesses 26 per truck 12 of six wheels 10. In this embodiment, each harness 26 couples EMA drive signals from one of the EMACs 20 to six EMAs 16. The six EMAs 16 associated with one harness 26 are broken into pairs of EMAs 16 and each EMA pair is associated with one of the wheels 10 so that not more than two EMAs per wheel 16 receive drive signals over the same harness 26. Although not illustrated, a similar arrangement is repeated for the other six wheeled truck 12.

Figure 3:
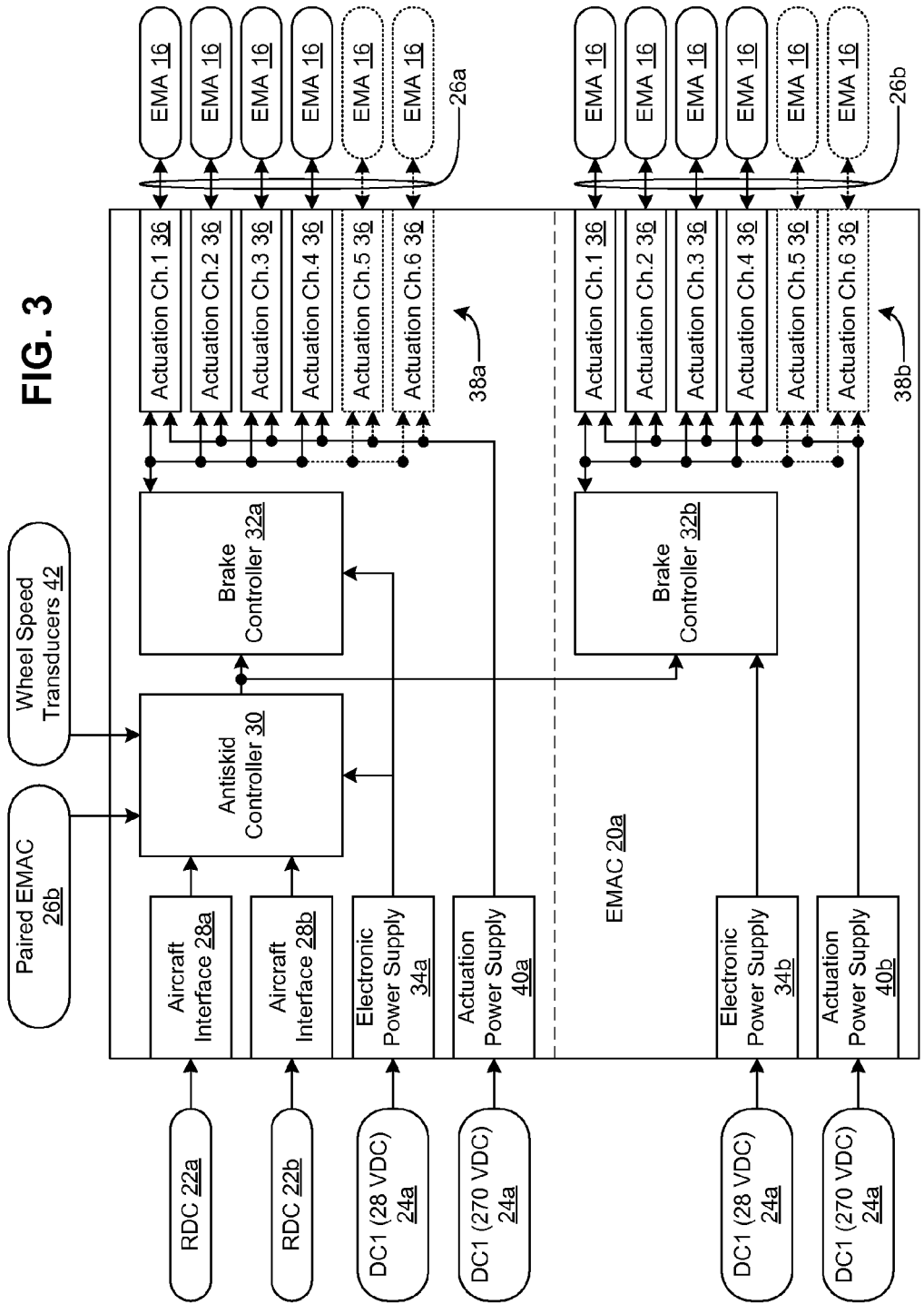
FIG. 3 is a block diagram of an exemplary electromechanical actuator controller (EMAC) that forms part of the exemplary aircraft brake control architectures.

With additional reference to FIG. 3, the first EMAC 20a is shown in greater detail. The second through fourth EMACs 20 have a similar configurations. Therefore, detailed illustration of all of the EMACs 20 is omitted to avoid repetition. It is noted that the second and fourth EMACs 20 receive power from the second power bus (DC2) 24b, instead of the first power bus (DC1) 24a as illustrated in FIG. 3.

Each EMAC 20 has a first aircraft interface 28a that communicates with the primary RDC 22 for the EMAC 20 so that signals may be exchanged with one or both of the BSCUs 18. A second aircraft interface 28b communicates with the other RDC 22 to serve as a backup to the first aircraft interface 28a and the associated primary communication link to the BSCUs 18.

Command signals from the BSCUs 18 that are received over the aircraft interfaces 28 are input to an antiskid controller 30. The antiskid controller 30 processes the command signals to compute one or more electromechanical actuator drive control signals. The antiskid controller 30 outputs the drive control signal to a first brake controller 32a and a second brake controller 32b. With the exception of receiving drive control signals from the antiskid controller 30, the second brake controller 32b is physically and/or electrically isolated from the first brake controller 32a. Other components of the first EMAC 20a are physically and/or electrically isolated.

The dashed line in FIG. 3 represents the demarcation between isolated components. To this end, the antiskid controller 30 and the first brake controller 32a receive operating power from the low voltage side of the corresponding power bus 24 through a first electronic power supply 34a and the second brake controller 32b receives operating power from the low voltage side of the corresponding power bus 24 through a second electronic power supply 34b.

Each EMA 16 that is controlled by the EMAC 20 is driven by a drive signal that is output by a corresponding actuation channel driver 36. Drivers are also referred to in the art as actuation channels. The drivers 36 may carry out commutation and voltage switching in order to output the respective drive signals.

The first brake controller 32a converts the drive control signals from the antiskid controller 30 into individual drive control signals for a first group 38a of drivers 36 and the second brake controller 32b converts the drive control signals from the antiskid controller 30 into individual drive control signals for a second group 38b of drivers 36. Drive signals output by the first group of drivers 36 are coupled to the respective EMAs 16 using conductors of one of the harnesses 26 (e.g., the first harness 26a in the case of the first EMAC 20a) and drive signals output by the second group of drivers 36 are coupled to the respective EMAs 16 using conductors of another of the harnesses 26 (e.g., the second harness 26b in the case of the first EMAC 20a). In the eight wheel embodiment where each EMAC 20 controls eight EMAs 16, the first group 38a of drivers 36 may include four drivers 36 and the second group 38b of drivers 36 also may include four drivers 36 (e.g., the drivers 36 and EMAs 16 shown in solid lines in FIG. 3). In the twelve wheel embodiment each EMAC 20 controls twelve EMAs 16, the first group 38a of drivers 36 may include six drivers 36 and the second group 38b of drivers 36 also may include six drivers 36 (e.g., the drivers 36 and EMAs 16 shown in both solid lines and dotted lines in FIG. 3).

Power used by the first group 38a of drivers 36 to output corresponding drive signals may be derived from a high voltage side of the corresponding power bus 24 through a first actuation power supply 40a. Similarly, power used by the second group 38b of drivers 36 to output corresponding drive signals may be derived from the high voltage side of the corresponding power bus 24 through a second actuation power supply 40b.

According to an aspect of the illustrated embodiments, the antiskid controller 30 performs antiskid control for each of the braked wheels 10 associated with the truck 12 that the EMAC 20 is also associated. As such, the EMAC 20 provides both conventional brake control (e.g., using the brake controllers 32a and 32b) as well as antiskid control. Such antiskid control may be conducted by carrying out an antiskid algorithm using the antiskid controller 30. This differs from conventional systems in which antiskid control is performed by the BSCU(s) 18. For instance, for the antiskid controller 30 of the first EMAC 20a may perform antiskid control for the wheels 10a through 10d of the embodiment of FIG. 1. For the embodiment of FIG. 2, the antiskid controller 30 may perform antiskid control for the wheels 10a through 10f.

For redundancy in antiskid control, the first EMAC 20a may be paired with the second EMAC 20b and the third EMAC 20c may be paired with the fourth EMAC 20d. Both antiskid controllers 30 from the pair of EMACs 20 carries out control computations. Therefore, both antiskid controllers 30 independently conduct complete parallel processing of the antiskid algorithm for each wheel 10 of the associated truck 12. These computations may be based on signals generated by wheel speed transducers 42 that are respectively associated with each wheel 10. The signals from the wheel speed transducers 42 may contain corresponding wheel speed measurements ($\omega_s$) and may be input to the antiskid controllers 30.

For the pair of EMACs 20 for each truck 12, one of the antiskid controllers 30 from one of the EMACs 20 has primary responsibility for antiskid control of all of the associated wheels and the other serves as a backup. In this manner, the first and second EMACs 20a and 20b and the third and fourth EMACs 20c and 20d perform antiskid control in such a manner so as to avoid competing antiskid control for a given wheel. To this end, the antiskid controller 30 that is primary communicates drive control signals for the brake controllers 32 of the paired EMAC 20 to the backup antiskid controller 30. The backup antiskid controller 30 communicates the received drive control signals to the brake controllers 32 of the corresponding EMAC 20 that, in turn, communicates individual drive control signals to the associated drivers 36 so that corresponding drive signals are output to the EMAs 16 controlled by the EMAC 20. As a result, a drive signal is provided to each EMA 16 in order to provide the appropriate braking to the wheels 10.

If the primary antiskid controller 30 were to experience problems (e.g., loose a signal from a wheel speed transducer 42, experience difficulty in computing drive control signals, loose power, etc.), the backup antiskid controller 30 will become the primary antiskid controller 30 and will serve as the source of drive control signals for the brake controllers 32 of the pair of EMACs 20. To assist in determining which antiskid controller 30 is best suited to be the primary antiskid controller 30, the antiskid controllers 30 may share health and status information with one another, including self-diagnostic data and cross-diagnostic data. In one embodiment, a determination to switch primary and backup antiskid control responsibilities is made by the antiskid controller 30 that is currently the primary antiskid controller 30.

Since antiskid control is conducted in the EMACs 20 instead of the BSCUs 18, data traffic through the RDCs 22 is reduced, both in terms of wheel speed measurement data that would be ordinarily routed to the BSCUs 18 and brake control signals that would be routed from the BSCUs 18 to the EMACs 20. In addition, response time of the braking system may improve. Also, the measured wheel speeds are provided directly to the corresponding EMACs 20, reducing response lag, cable length, cost, etc.

Although the invention has been shown and described with respect to certain preferred embodiments, equivalents and modifications will occur to others who are skilled in the art upon reading and understanding of the specification. The present invention includes all such equivalents and modifications, and is limited only by the scope of the following claims.

What is claimed is:

1. An electromechanical braking system, comprising: at least one brake system control unit (BSCU) for converting brake command signals into output brake command signals;
   a plurality of electromechanical actuators (EMAs) arranged with respect to wheels to be braked;
   a first electromechanical actuator controller (EMAC) that includes a first antiskid controller and includes a driver for each EMA controlled by the first EMAC, wherein the first antiskid controller generates a primary set of drive control signals based on the brake command signals from the BSCU and in accordance with am antiskid algorithm, the primary set of drive control signals used to control each driver of the first EMAC to output corresponding drive signals to the corresponding EMAs;
   a second EMAC that includes a second antiskid controller and includes a driver for each EMA controlled by the second EMAC, wherein the second EMAC receives at least some of the primary drive control signals from the first antiskid controller and uses the received primary drive control signals to control each driver of the second EMAC to output corresponding drive signals to the corresponding EMAs; and
   a first remote data concentrator in communication with the first EMAC and the second EMAC,
   wherein the BSCU communicates with the first EMAC through the first remote data concentrator,
   wherein the second antiskid controller independently of the first antiskid controller conducts complete parallel processing of the antiskid algorithm to generate a backup set of drive control signals for controlling each EMA controlled by the first and second EMACs, the backup set of drive control signals based on the brake command signals from the BSCU.

2. The braking system of claim 1, wherein the backup set of drive control signals are used in place of the primary drive control signals if operation of the second antiskid controller is determined to be better than operation of the first antiskid controller.

3. The braking system of claim 2, wherein the determination to use the backup set of drive control signals is made by the first antiskid controller.

4. The braking system of claim 1, wherein the wheels are wheels of an aircraft.

5. The braking system of claim 4, wherein the wheels are divided between two landing gear trucks.

6. The braking system of claim 5, wherein the first and second antiskid controllers exclusively carry out antiskid control for wheels of one of the trucks.

7. The braking system of claim 6, wherein antiskid control for wheels of the other of the landing gear trucks is carried out by at least one antiskid controller that is separate from the first and second antiskid controllers.

8. The braking system of claim 7, further comprising: additional EMAs arranged with respect to wheels of the other of the landing gear trucks; and third and fourth EMACs that respectively include third and fourth antiskid controllers that generate drive control signals that are used to control generation of drive signals that control the additional EMAs.

9. The braking system of claim 6, wherein the drivers of each EMAC are grouped into at least two groups and, for each EMAC, drive signals from a first group of drivers are coupled to respective EMAs over a first harness for the associated truck and EMAC, and drive signals from a second group of drivers are coupled to respective EMAs over a second harness for the associated truck and EMAC.

10. The braking system of claim 9, wherein the EMAs are arranged with respect to the wheels so that less than all EMAs per wheel receive drive signals over a single harness.

11. The braking system of claim 9, wherein the EMAs are arranged with respect to the wheels so that less than all EMAs per wheel receive drive signals from a single EMAC.

12. The braking system of claim 9, wherein, for each EMAC, the groups of drivers are isolated, the isolation including separate connections to a power bus.

13. The braking system of claim 4, wherein the aircraft includes at least one of 8 braked wheels and 12 braked wheels.

14. The braking system of claim 1, wherein the remote data concentrator is in communication with the at least one BSCU.

15. The braking system of claim 1, further comprising wheel speed sensors that measure the speed of the wheels to be braked, and wherein outputs of the sensors are input to the antiskid controls of the EMACs independent of the at least one BSCU for purposes of performing the antiskid control.

16. The braking system of claim 1, wherein the first EMAC and the second EMAC receive power from independent power busses.

17. The braking system of claim 1, wherein the first emote data concentrator is in communication with the BSCU.

18. The braking system of claim 17, wherein the first remote data concentrator provides redundancy to a communications pathway between the BSCU and the first EMAC.

* * * * *